United States Patent [19]

Jenning et al.

[11] Patent Number: 4,697,183
[45] Date of Patent: Sep. 29, 1987

[54] MEANS FOR NON-CONTACTING SIGNAL AND ENERGY TRANSMISSION

[75] Inventors: Michael Jenning; Holger Mackenthun, both of Hamburg, Fed. Rep. of Germany

[73] Assignee: Angewandte Digital Elektronik, Fed. Rep. of Germany

[21] Appl. No.: 810,558

[22] Filed: Dec. 19, 1985

[30] Foreign Application Priority Data

Dec. 21, 1984 [DE] Fed. Rep. of Germany ....... 3447560

[51] Int. Cl.$^4$ ...................... G08C 19/24; G08C 19/00
[52] U.S. Cl. .......................... 340/870.25; 340/870.31; 318/608; 324/233
[58] Field of Search ...................... 340/870.25, 870.31, 340/870.32, 870.34; 318/605, 608, 654, 655, 661, 690, 692; 324/226, 233, 239, 243

[56] References Cited

U.S. PATENT DOCUMENTS

| 3,634,838 | 1/1972 | Grangyist | 340/870.25 |
| 3,713,124 | 1/1973 | Durland et al. | 340/870.25 |
| 3,803,567 | 4/1974 | Pezzlo et al. | 340/870.25 |
| 4,358,722 | 11/1982 | Iwakane et al. | 340/870.25 |
| 4,475,105 | 10/1984 | Kurosawa | 340/870.25 |
| 4,511,896 | 4/1985 | Cousins, III | 340/870.25 |

Primary Examiner—John W. Caldwell, Sr.
Assistant Examiner—Mahmoud Fatahi-yar
Attorney, Agent, or Firm—Hill, Van Santen, Steadman & Simpson

[57] ABSTRACT

A noncontacting signal and energy transmission device includes a stationary microstation and a moveable microunit, wherein data is transmitted between the microstation and the microunit simultaneously by phase shifted signals and by synchronously switched signals, which also supply power to the microunit.

12 Claims, 8 Drawing Figures

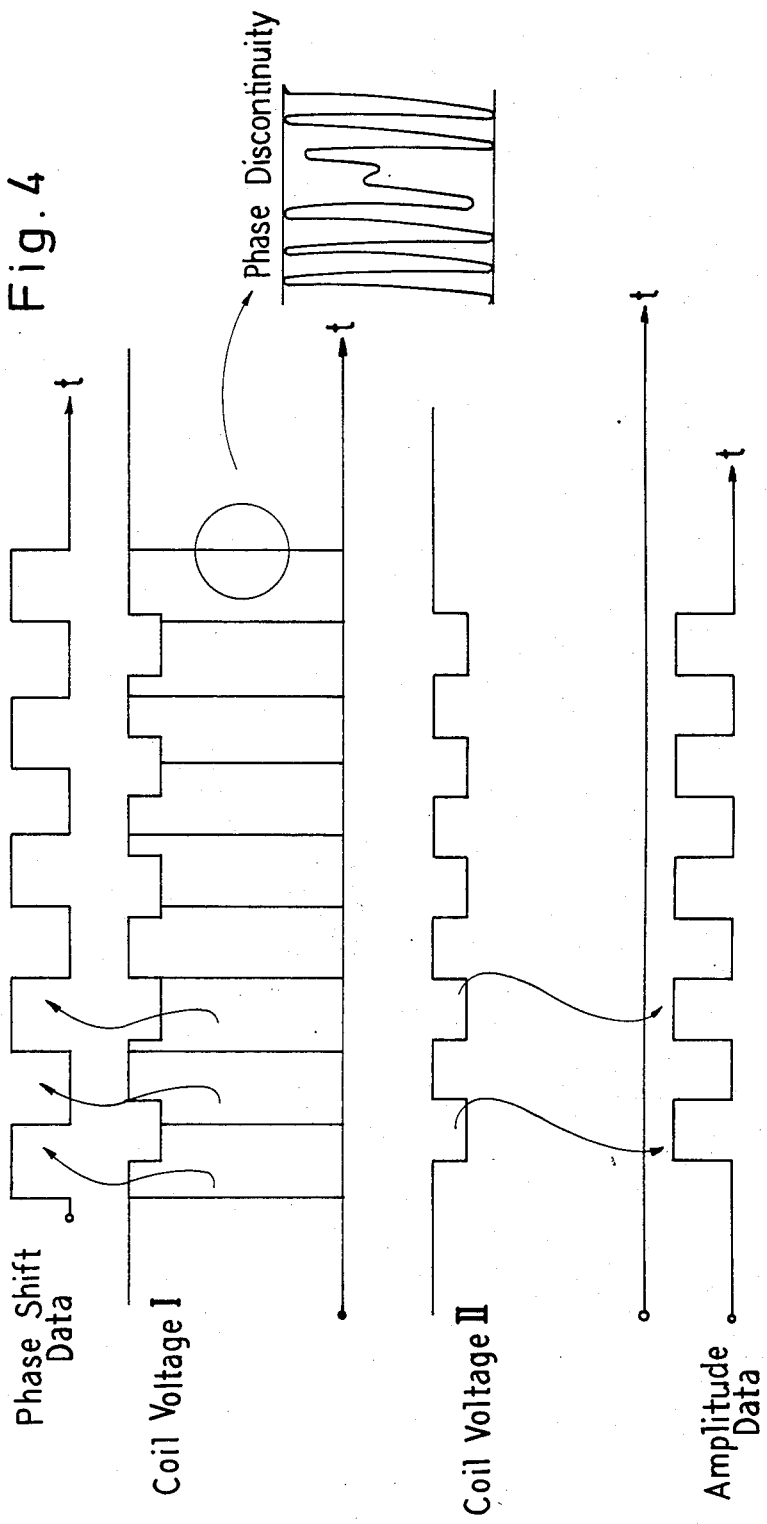

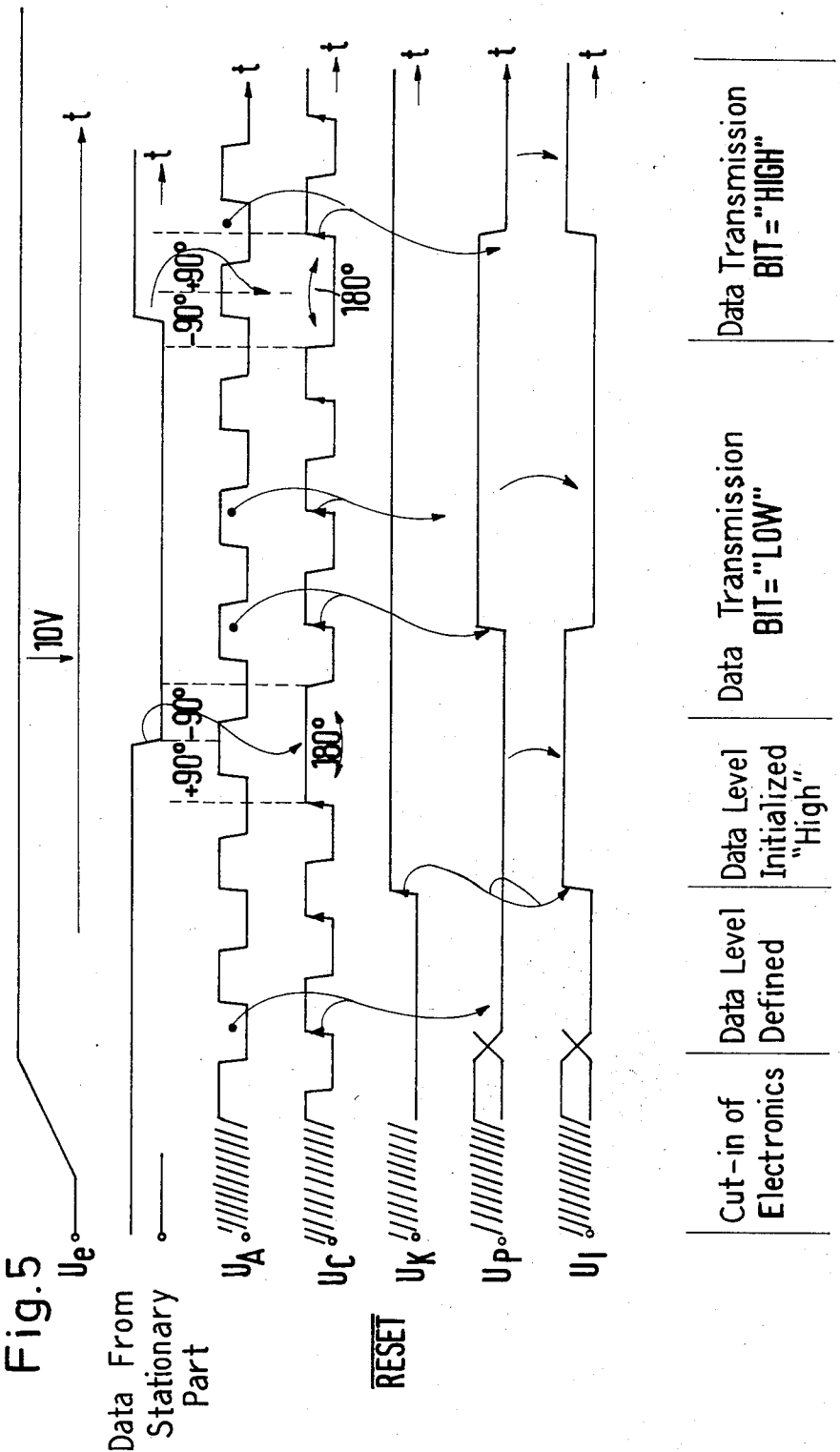

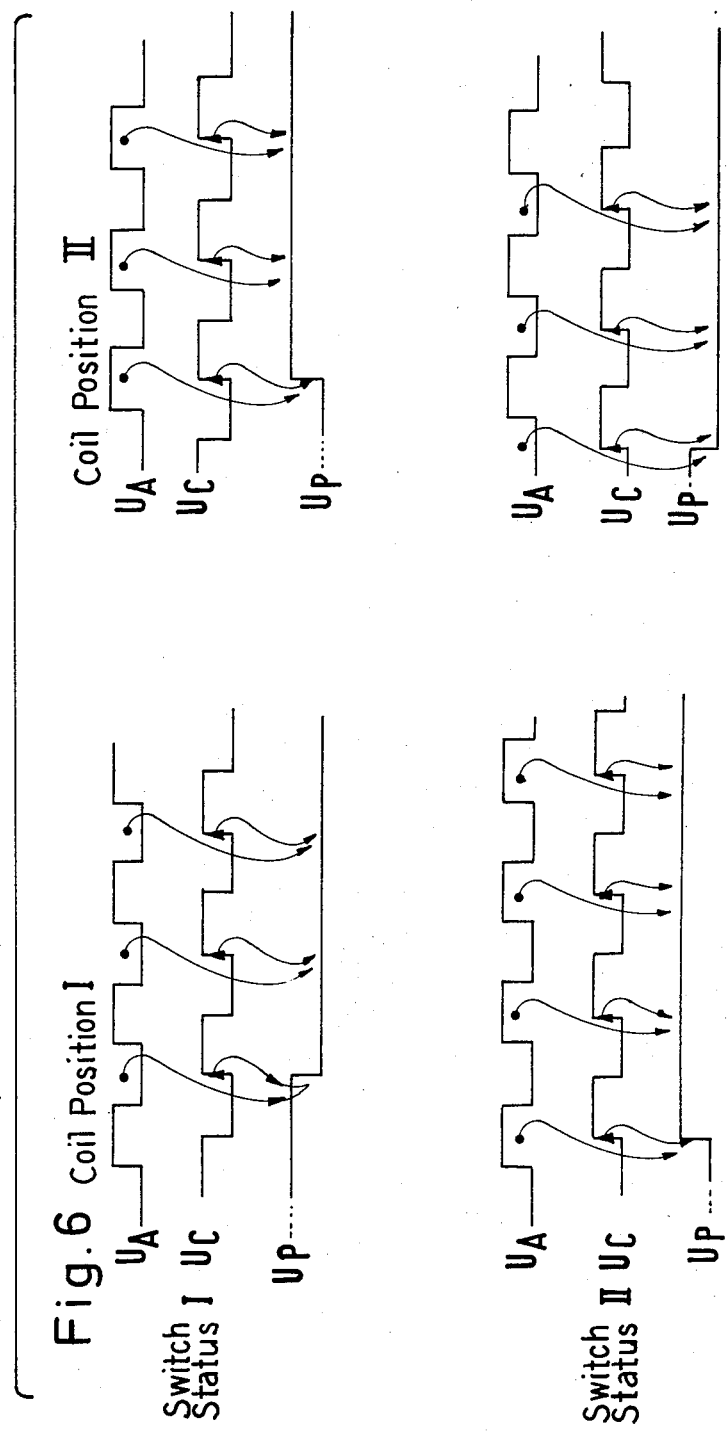

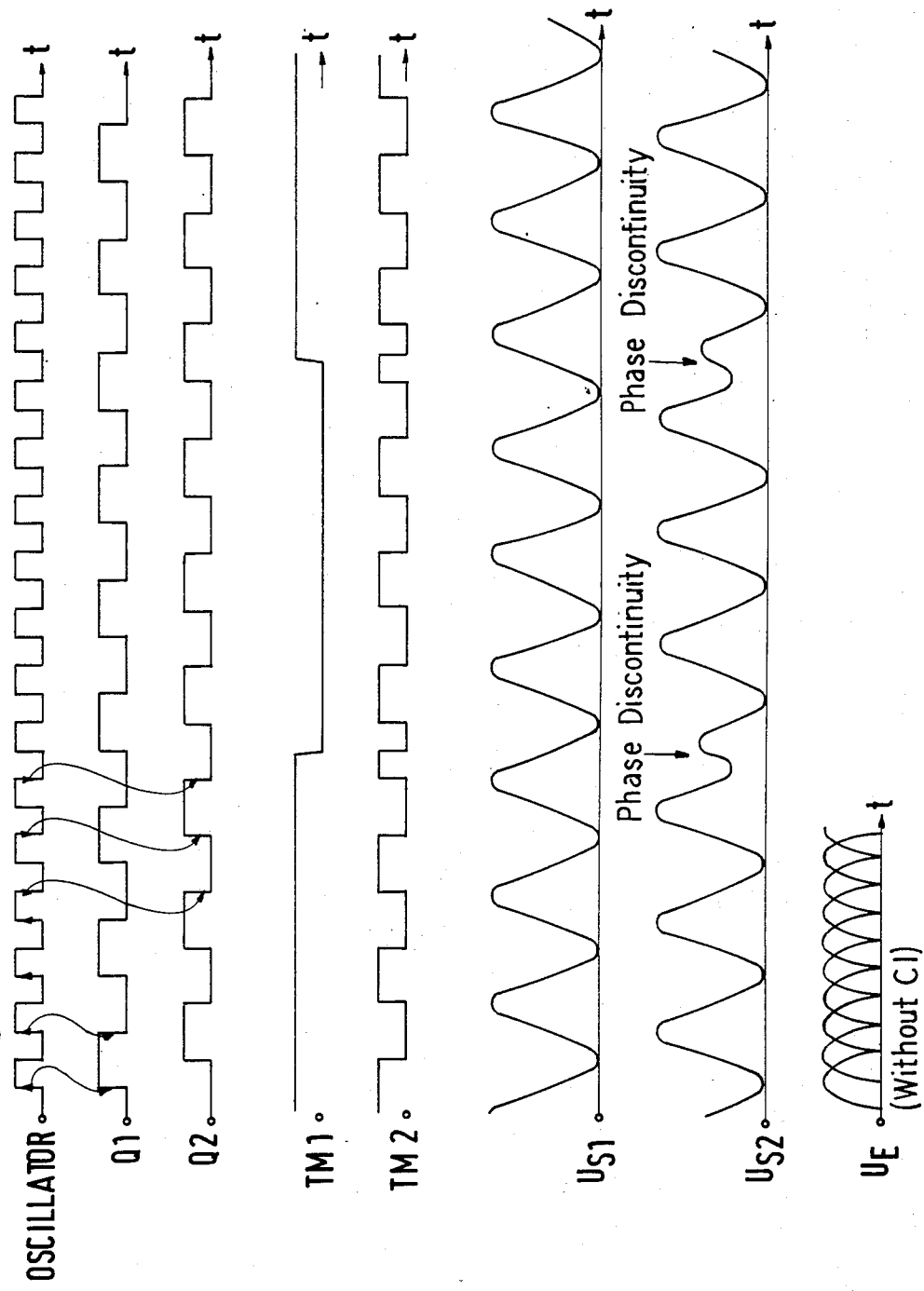

MEANS FOR NON-CONTACTING SIGNAL AND ENERGY TRANSMISSION

BACKGROUND OF THE INVENTION

Field of the Invention

The invention relates generally to a means for non-contacting signal and energy transmission having a stationary part and a movable part, and more particularly to a stationary microstation at a movable microunit.

SUMMARY OF THE INVENTION

An object of the present invention is to transmit information and energy between a stationary part and a movable part in a non-contacting fashion, i.e. without contact between the respective parts. In such a system the stationary part should also provide power to the movable part. It is essential that such a system meet a series of demands including, firstly, that the movable part both receive data and energy as well as transmit data independently of its position with respect to the stationary part. Secondly, and more importantly, the movable unit must operate to receive data at the same time as it is transmitting data to the stationary part. The data reception should be independent of the electrical load of the circuits of the microunit and, lastly, it is essential that amplitude fluctuations due to variations in the transmission path and due to temperature influences and other influences do not affect the signal transmission.

BRIEF DESCRIPTION OF THE DRAWINGS

FIG. 1a is a block circuit diagram of a device according to the present invention;

FIG. 1b is a schematic representation of the various alternate positions of the microunit relative to the microstation;

FIG. 4 is a time diagram showing signal graphs of the device of the present invention;

FIG. 5 is a time diagram showing signal graphs of the device of FIG. 2;

FIG. 6 is a plurality of signal graphs similar to that of FIG. 5; and

FIG. 7 is a time diagram showing a plurality of signal graphs of the devices shown in FIGS. 1, 2 and 3.

DETAILED DESCRIPTION OF THE PREFERRED EMBODIMENTS

Figure 1A:
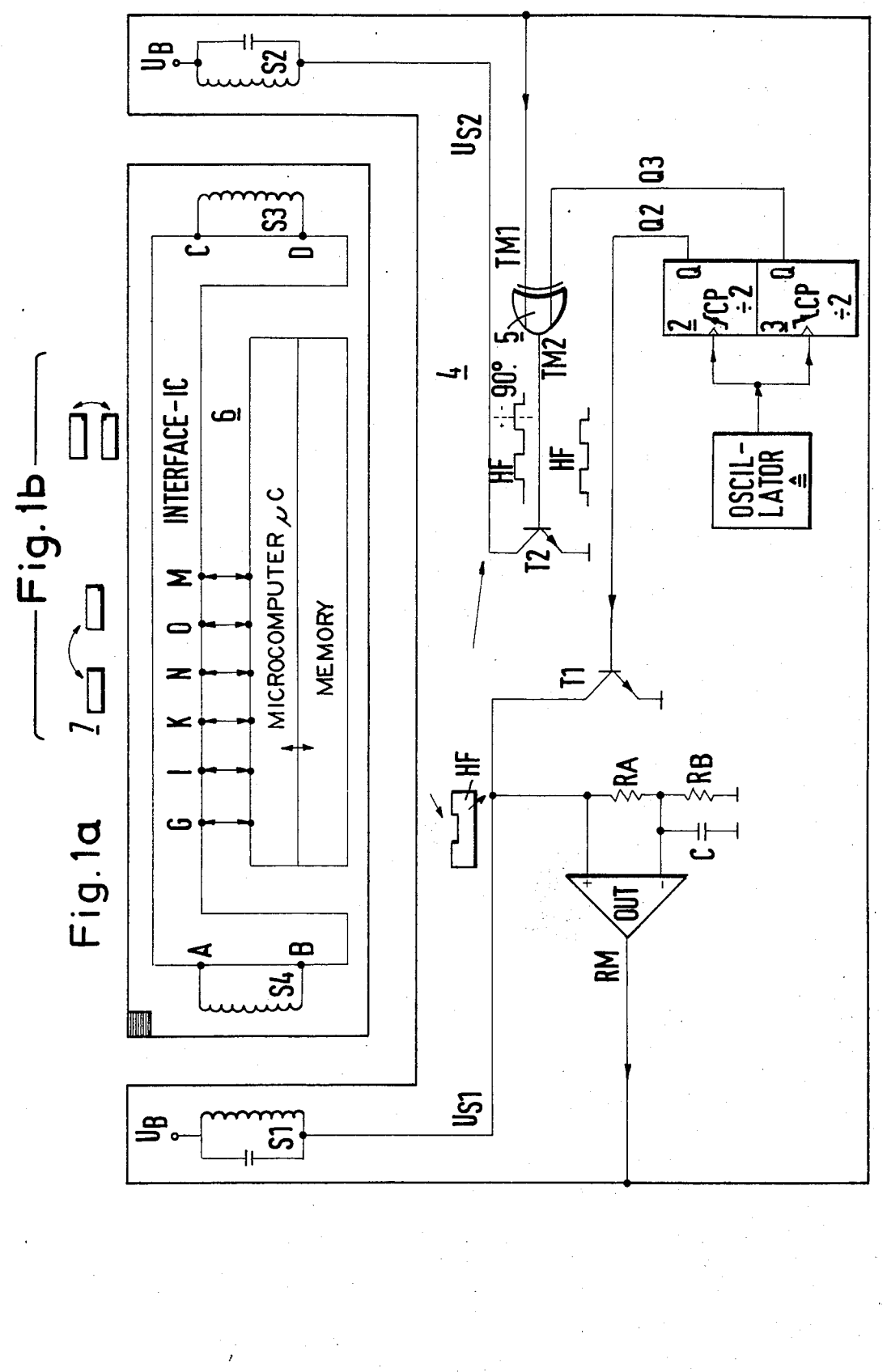
Figure 2:
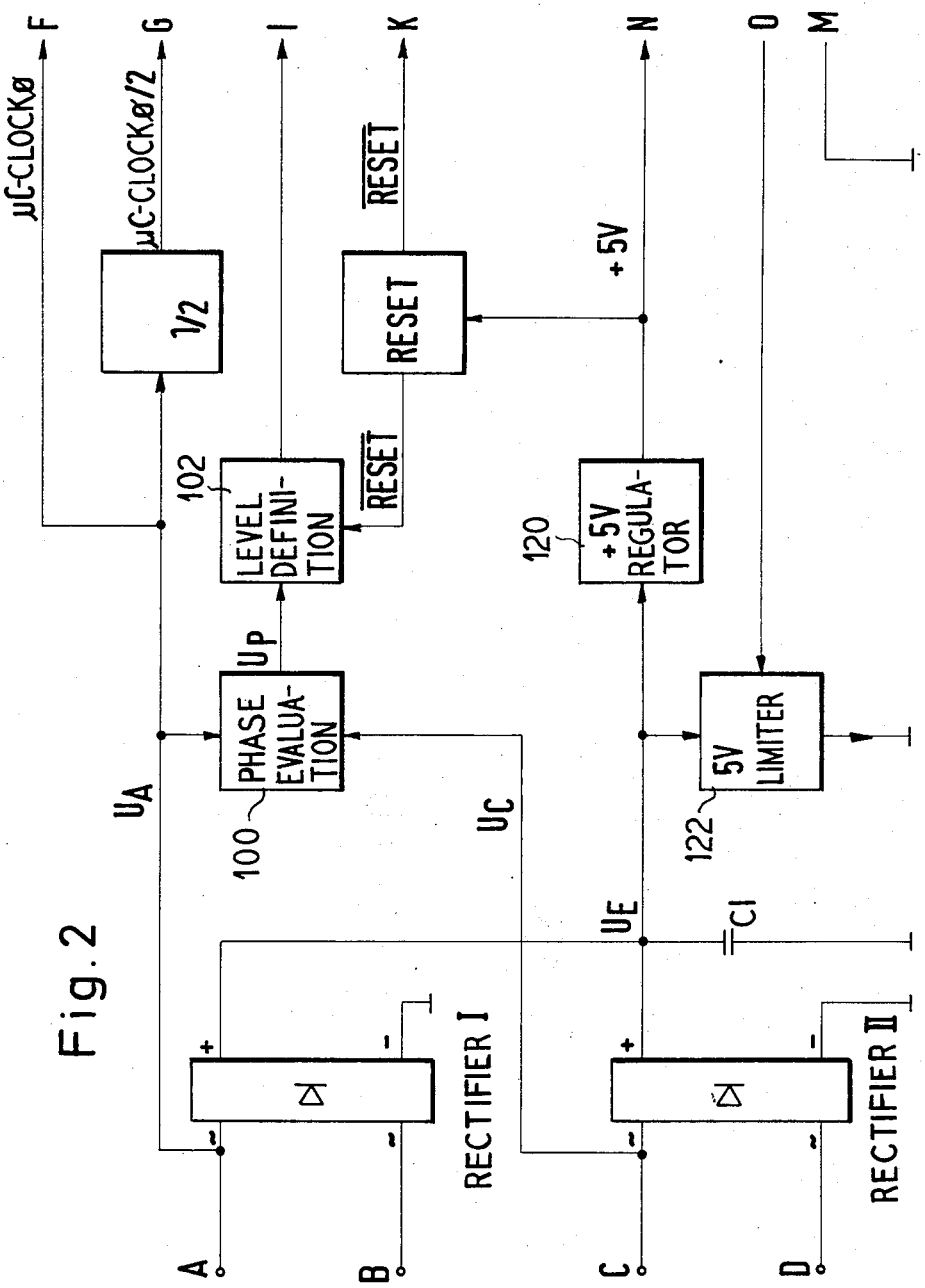
FIG. 2 is a block diagram of a interface portion of the device of FIG. 1.

FIG. 1a shows the device of the present invention including a stationary part 4 and a movable part 6. The stationary part 4 includes an oscillator 1 connected to a pair of flip-flops 2 and 3 at the clock inputs thereof. The flip-flop 2 responds to a positive going clock pulse while the flip-flop 3 responds to a negative going clock pulse, resulting in signal outputs at leads Q2 and Q3 having a phase shift of 90° with respect to one another. The signals on leads Q2 and Q3 produced by the flip-flops 2 and 3 are thus coherent and of identical frequency and are especially useful for contactless transmission. The signals on leads Q2 and Q3 drive respective transistors T1 and T2 which in turn transmit the signals to coils S1 and S2, respectively. The coils S1 and S2 provide contact free coupling with coils S3 and S4 of the movable portion 6 so that signals and energy can be transmitted therebetween.

As indicated in FIG. 1b, the movable part, or microunit, 6 is arbitrarily rotatable as symbolically indicated at 7. Irrespective of its orientation the microunit 6 receives coherent signals from the coils S1 and S2 of the stationary part 4 via coils S3 and S4.

The signal present on lead Q3 is selectively impressed with a 180° phase shift by data input to the stationary part 4 at input TM1. The phase shift does not change the coherency of the signals on leads Q2 and Q3, however. The signal on Q3 is input at one input of an exclusive-OR gate 5 while a signal lead TM1 is input at a second input of the exclusive-OR gate 5. [The signal curves at the output of the oscillator 1, the outputs of the flip-flops 2 and 3, the signals on leads TM1 and a signal TM2 at the output of the exclusive-OR gate 5 is shown in FIG. 7.] A change of state of the signal between high and low or visa versa TM1 results in a phase shift of 180° being imparted on the Q3 signal to produce a signal TM2. The signal TM2 is still coherent with and phase shifted by 90° with respect to the signal on lead Q2. Transistor T1 amplifies the signal Q2 for coil S1 and transistor T2 amplifies the signal TM2 for coil S2. There is, therefore, a 90° phase shift present between signals present on the coils S1 and S2 and the signal on S2 can be selectively shifted by 180°. A differential amplifier RM is connected to coil S1 in the microstation 4, along with capacitor C and resistors RA and RB to detect data received from the movable microunit 6 in the form of amplitude changes in the signal at coil S1.

Figure 3:
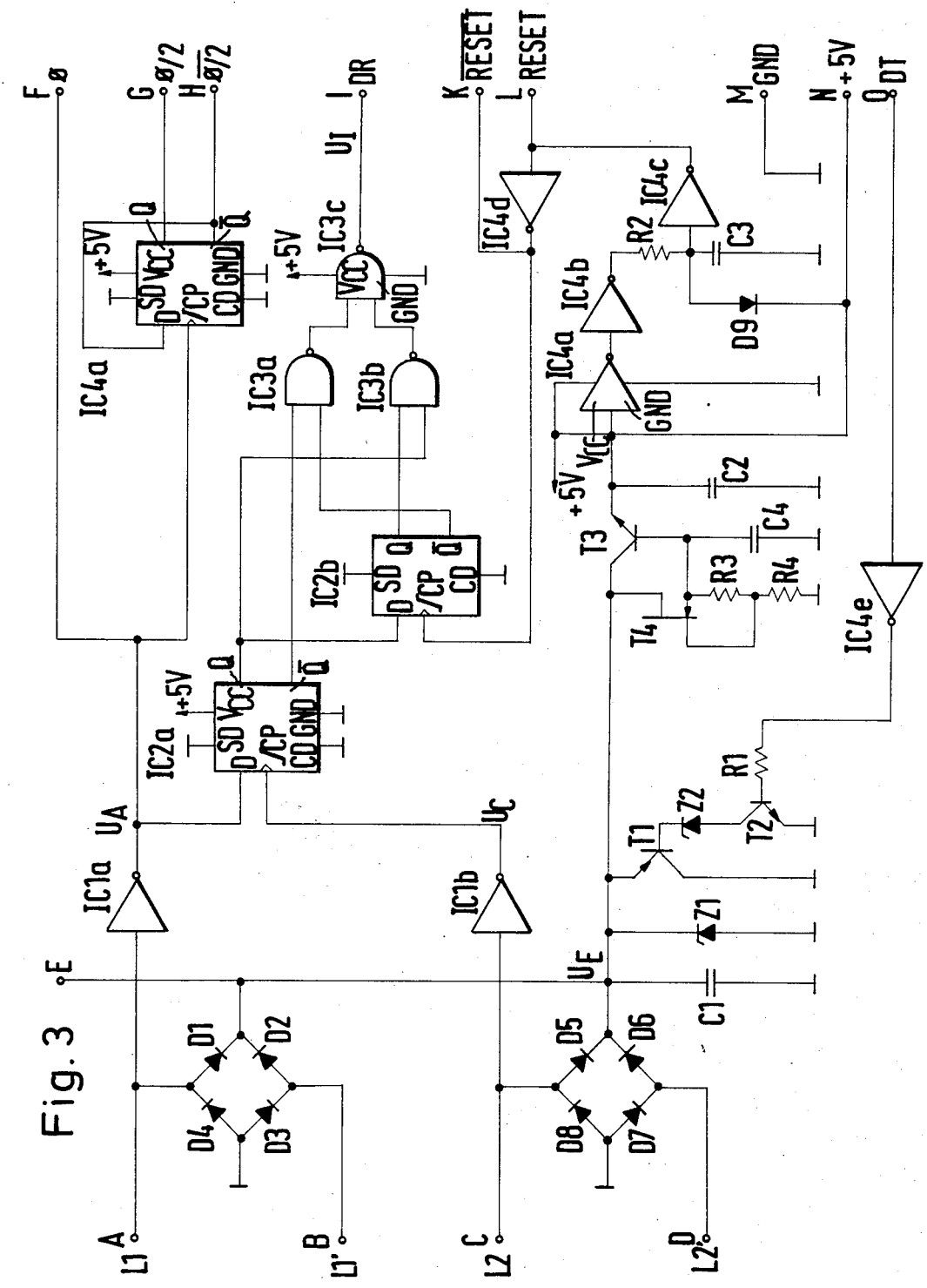
FIG. 3 is a circuit diagram of the device shown in FIG. 2.

The interface-IC portion of the movable unit 6 is shown in FIGS. 2 and 3 which transmits signals between the coils S3 and S4 and the microcomputer. Connection points A and B and connection points C and D correspond to connections to coils S4 and S3, respectively. Data transmission with the stationary portion 4 is accomplished according to two principles, that of synchronous switching which is controlled by the circuitry of the lower portion of FIG. 2 and that of phase shifting which is controlled by the circuitry of the upper portion of FIG. 2. Synchronous switching results in amplitude changes in the signal of the receiving coil which phase shifts cause phase shifting of the receiving coil signal. Thus, both types of data transmission can occur simultaneously between the stationary part 4 and the movable part 6.

Leads $U_A$ and $U_C$ are connected directly to the coils S4 and S3, respectively, and to a phase evaluation means 100 which detects phase changes in the signals from either coil S3 or S4. A phase output signal on lead $U_P$ is transmitted to a level defining means 102. The level defining means 102 more clearly defines the digital signal level and provides means for initializing the signal by a reset lead. The output of the level defining means 102 is transmitted to the microcomputer over lead I as data received from the stationary part 4. Thus, regardless of which of the coils S3 or S4 detect a phase skip, i.e., regardless of the spatial allocation of the coils S3 and S4 with respect to the coils S1 and S2, a phase shift generated by the stationary portion 4 on the basis of the circuitry of FIG. 1 is detected by the movable microunit 6.

Thus, in the present embodiment, the stationary portion 4 transmits data to the movable portion 6 by selectively shifting the phase of the signal at one of the coupled coil pairs.

The movable part 6 also transmits data to the stationary portion 4. In this embodiment, synchronous switching is used for data transmission in this second direction, although it is also foreseen to interchange the data transmission methods between the two parts 4 and 6.

Synchronous switching is accomplished in conjunction with the supply of power to the microcomputer of the movable part 4. The coil signals from coils S3 and S4 are rectified by rectifier I and II and the two signals are combined on lead $U_E$ and input to voltage regulator 120. The voltage regulator 120 supplies operating voltage to the microcomputer through lead N, as well as to the interface-IC. Data from the microcomputer is input to the interface-IC at lead 0 (FIG. 2) where it controls a 5 volt limiter 122 and connection to ground. The 5 volt limiter 122 selectively connects the lead $U_E$ to ground so that amplitude changes result in the signals of coils S3 and S4. The amplitude changes are detectable at coil S1 of the stationary part 4 through the operational amplifier RM and its associated circuitry. Thus, data is transmitted between the movable part 6 and the stationary part 4 by phase shifting in a first direction and by synchronous switching in a second direction.

FIG. 3 shows the circuit details of the interface unit of FIG. 2 including a full wave rectifying bridge D1–D4 which corresponds to rectifier I; and a second full wave rectifying bridge D5–D8 which corresponds to rectifier II. Signals tapped directly off of the coils S3 and S4 are inverted by inverters IC1b and IC1a. The output of inverter IC1a is provided over lead $U_A$ to a D input of D flip-flop IC2a while the output of inverter IC1b is provided over lead $U_C$ to a positive going clock pulse input of the flip-flop IC2a. The D flip-flop IC2a has the Q output thereof connected to an input of the NAND gate IC3b and to the D input of the D flip-flop IC2b. The $\overline{Q}$ output of the D flip-flop IC2a is connected to an input of the NAND gate IC3a. The Q and $\overline{Q}$ outputs of the D flip-flop IC2b are, likewise, connected to the inputs of the NAND gates IC3b and IC3a, respectively. The output of each of the NAND gates IC3a the IC3b are connected as inputs to NAND IC3c, the output of which is fed over lead $U_I$ to the I terminal of the microcomputer, also identified as DR or data received. The NAND gates IC3a, IC3b, and IC3c, in conjunction with the filp-flops IC2a and IC2b, form an exclusive-NOR gate.

The lead $U_A$ is connected to the clock pulse input of D flip-flop IC4a, the D input of which is linked by a feedback loop from the $\overline{Q}$ output thereof. The Q output of D flip-flop IC4a is connected to the G terminal of the microcomputer to provide a clock pulse $\phi/2$, while an H terminal is connected from the $\overline{Q}$ lead of the D flip-flop IC4a to provide a $\overline{\phi/2}$ clock pulse. The lead $U_A$ provides a $\phi$ clock pulse to F terminal of the microcomputer.

The rectified signals from rectifiers I and II are linked to node $U_E$ which is filtered by capicator C1. A zener diode Z1 is connected across capicator C1 as is transistor T1. A second zener diode Z2 and a second transistor T2, along with resistor R1 and inverter IC4e make up the five volt limiter and connection 122 to ground through which data is transmitted to the stationary part 6 from the O terminal of the microcomputer, also identified as DT or data transmit.

The five volt regulator 120 which supplies operating voltage as lead N is made up of FET T4, transistor T3 resistors R2, R3, and R4, capicators C2, C3, and C4, inverters IC4a, IC4b, and IC4c, as well as diode D9.

The output of inverter IC4c is connected to the reset terminal L so that a signal level is defined initially at the reset. The reset terminal L is connected through an inverter IC4d to the clock pulse input of flip-flop IC2b so that the data received can be initialized.

FIG. 4 illustrates the simultaneous transmission of data by synchronous switching and by phase shifting. The uppermost signal diagram is of digital data that has been detected by the phase evaluation unit 100 for receipt by the microcomputer $\mu C$. The second signal diagram is the signal at the coil S1 of the stationary part 4 during simultaneous data transmission. The vertical lines represent the phase discontinuities generated by data received at lead TM1 of the stationary part 4 for transmission to the movable part 6. One of the phase discontinuities is shown in the enlarged detail. The amplitude changes present in the S1 signal are the result of data transmission by synchronous switching. The third signal diagram also includes the synchronous switching data and represents the signal present on coil S2 of the stationary part 4. The coil S2 signal is used by the amplitude evaluation circuit RM, the output of which is shown in the lower most signal diagram, to detect the synchronous switched data which is received by the stationary part 4.

The voltages at some of the points of the microunit 6 are shown in FIG. 5, as the unit is turned on and data bits are transmitted. When power is first received by the coils S3 and S4, the node voltage $U_E$ goes from ground to an amplitude of 10 volts so that power is supplied to the voltage regulator 120 and thereafter to the microcomputer $\mu C$. During this time, the signals at leads A, C, K, P and I are undefined. Once the electronics have been turned on, a data level is defined. The voltage on lead $U_A$ from coil S4 alternates from high to low in a square wave, as does the voltage on lead $U_C$ from coil S3. A coincidence of a positive going signal on $U_C$ while the signal on $U_A$ is at a low state caused the Q output of the D flip-flop IC2a, shown as $U_P$, to assume a low state. As can be seen, voltages $U_A$ and $U_C$ are alternating with a phase shift of 90 degrees. The reset input at $U_K$ from the microcomputer $\mu C$ goes from a low state to a high state during the low state on $U_P$ which initializes the output data level $U_I$ at a high state. Thus, the levels are initialized so that $U_I$ is always at a high state at first.

Once initialization is accomplished, the movable part 6 begins to receive data transmitted by the stationary part 4, shown at TM1. The data from the stationary part 4 goes from high to low, causing a phase shift of 180 degrees in the signal $U_C$, although the shift could also occur at $U_A$ depending upon the orientation of the movable part 6. Once a phase shift in one of the signals $U_A$ or $U_C$ has occurred, a change results in $U_P$, for instance, the high going pulse at $U_C$ always encounters the same state at $U_A$ unless there has been a phase shift of one of the signals. After the phase shift, the high going pulse on $U_C$ is compared to the high pulse at $U_A$ resulting in a change in $U_P$ from a low to a high state. The change in $U_P$ likewise causes a change in $U_I$ so long as the reset at $U_K$ remains high. Thus, a low bit has been transmitted, albeit delayed somewhat from the data TM1 at the microstation 4. The transmission of a high bit causes another phase shift of 180 degrees in $U_C$. A similar procedure is followed to transmit the high bit at $U_I$. Thus, by phase shifts in one of the signals $U_A$ or $U_C$, the data bits from the microstation 4 are transmitted to the microcomputer at $U_I$. As can be seen, the data transmission does not occur unless the reset signal has been received from the microcomputer μC, indicating that it is ready to receive data.

In FIG. 6, the signals $U_A$, $U_C$, and $U_P$ are shown for all possible coil positions and switch status positions, indicating that data is transmitted irrespective of the movable part, or microstation, 6 orientation.

In FIG. 7, signal diagrams are shown for the stationary part 4. The signal characteristics of the oscillator output, the leads Q2 and Q3, the leads TM1 and TM2, as well as the leads US1 and US2 are shown. The high going portion of the oscillator output triggers changes in the signal Q2, while the low going portion of the oscillator signal triggers changes in the signal Q3. Data to be transmitted to the microunit 6 is input on lead TM1, resulting in phase shifts in the signal TM2, which is derived from the signal Q3. The signal $U_{S1}$ is the signal through the coil S1 which results from the signal Q2, while the signal $U_{S2}$ is the coil S2 signal caused by TM2. The phase shifts in the signal TM2 appears as phase discontuities in the signal $U_{S2}$. The lower most diagram shows the signal of $U_E$ (without the filter capacitor C) of the movable part 6 during data transmission by phase shifting. As described above, the rectified combined signal $U_E$ provides a power source independent of the relative position of the coils, and irrespective of the phase shift data transmission.

Data transmission path by synchronous switch is usable parallel to and simultaneously with the phase shift data transmission. Neither the signal reception from the microstation 4 nor the signal transmission to the microstation 4 disturb the energy transmission.

It is apparent from the foregoing specification, that the invention is susceptible to being embodied with various alterations and modifications which may differ particularly from those that I have described in the preceding specification and description. It should be understood that I wish to embody within the scope of the patent granted hereon, all such modifications as reasonably and properly come within the scope of my contribution to the art.

We claim:

1. A device for contact-free signal and energy transmission having a stationary part and a movable part, comprising:
    an oscillator in the stationary part to generate a periodic signal of a fixed frequency;
    means for producing first and second coherent signals having a phase shift of approximately 90 degrees with respect to one another from said fixed frequency periodic signal;
    first and second branches connected to said coherent signal producing means to transmit respective ones of said first and second signals;
    a circuit means connected to said first branch to selectively impart approximately 180 degree phase shifts on said first signal corresponding to a signal to be transmitted;
    first and second coils connected to respective ones of said first and second branches to transmit said respective first and second signals;
    third and fourth coils disposed at said movable part for signal transmission and reception by inductive coupling with said first and second coils, said third and fourth coils being selectively inductively coupled to respective ones of said first and second coils and alternately to respective ones of said second and first coils so that transmission of said signal to be transmitted occurs from said stationary part to said movable part by inductive coupling of said coils; and
    a phase evaluation connected at said movable part for documenting said phase shifts for signal transmission to said movable part.

2. A device as claimed in claim 1, wherein said first and second coherent signal producing means includes a pair of complimentary flip-flops connected to an output of said oscillator, one of said flip-flops responding to positive-going portions of said periodic signal and another of said flip-flops responding to negative-going portions of said periodic signal so that output signals of said one and another flip-flop are of the same frequency but are shifted in phase relative to one another.

3. A device as claimed in claim 1, further comprising:
    a first active circuit element connected in said first branch between said 180 degree phase shift means and said first coil to amplify said first signal; and
    a second active circuit element connected in said second branch to amplify second signal.

4. A device as claimed in claim 3, wherein said first and second active circuit elements are transistors.

5. A device as claimed in claim 1, further comprising:
    an interface in said movable part connected to said third and fourth coils to receive inductively coupled first and second signals for detecting said signal to be transmitted; and
    a microcomputer in said movable part connected to said interface to receive said signal to be transmitted.

6. A device as claimed in claim 5, wherein said interface includes:
    a first rectifier connected to said fourth coil;
    a second rectifier connected to said third coil;
    a voltage regulator connected to said first and second rectifiers and having a power supply output connected to said microcomputer to supply power from signals inductively coupled to said third and fourth coils simultaneously with transmission of said signal to be transmitted.

7. A device as claimed in claim 5, further comprising:
    a third flip-flop connected to said third and fourth coils to detect phase shifts in a signal inductively coupled to at least one of said third and fourth coils.

8. A device as claimed in claim 7, further comprising:
    level defining means for transmitting data to said microcomputer, said level defining means including;
    a fourth flip-flop connected to an output of said third flip-flop and to a reset lead from said microcomputer, and
    at least one logic gate connected to outputs of said third and fourth flip-flop.

9. A device for non-contacting energy and signal transmission between a microstation and a microcomputer controlled microunit, comprising:
    a microstation including:
        means for generating first and second coherent periodic signals, said first signal being phase shifted by approximately 90 degrees with respect to said second signal;
        means for selectively imparting an approximately 180 degree phase shift on one of said first and second signals;
        first and second inductive couplers connected to said first and second signal generating means to transmit respective ones of said first and second signals;

a microunit including:

third and fourth inductive couplers mounted for selective coupling said first and second inductive couplers, said third coupler being couplable to said first coupler and said fourth coupler being couplable to said second coupler when said microunit and said microstation are in a first relative position and said third coupler being couplable to said second coupler and said fourth coupler being couplable to said first coupler when said microunit and said microstation are in a second relative position;

an interface connected between said third and fourth coils and said microcomputer, said interface including:

means for phase evaluation of signals at said third and fourth coils, means for level definition of signals from said phase evaluation means, means for rectifying signals from said third and fourth coils, and means for regulating said rectified signal to supply power to said microcomputer;

whereby signal transmission from said microstation to said microunit ensues by said selective phase shifts.

10. A device as claimed in claim 9, wherein said interface includes means for transmitting data from said microcomputer to said microstation, and further comprising means in said microstation for detecting said data.

11. A device as claimed in claim 10, wherein said data transmitting means includes means for selectively loading one of said third and fourth coils and said data detecting means includes means for detecting signal amplitude variations in at least one of said first and second coils.

12. A device as claimed in claim 1, further comprising:

means in said movable part for synchronous switching to transmit data from said movable part to said stationary part by inductive coupling simultaneously with the transmission of said phase shifted signal to be transmitted.

* * * * *